(12) United States Patent
Kawamura et al.

(10) Patent No.: US 7,443,287 B2
(45) Date of Patent: Oct. 28, 2008

(54) PORTABLE DEVICE

(75) Inventors: Masayuki Kawamura, Aichi (JP);
Yutaka Yoshida, Aichi (JP); Toshimasa Shibagaki, Aichi (JP); Masachika Kamiya, Toyota (JP); Noriyasu Onishi, Aichi-ken (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 266 days.

(21) Appl. No.: 11/227,579

(22) Filed: Sep. 15, 2005

(65) Prior Publication Data
US 2006/0061459 A1 Mar. 23, 2006

(30) Foreign Application Priority Data
Sep. 21, 2004 (JP) .............................. 2004-274038

(51) Int. Cl.
*B60R 25/10* (2006.01)
(52) U.S. Cl. .................. 340/426.36; 340/5.72
(58) Field of Classification Search ............ 340/426.36, 340/5.72
See application file for complete search history.

(56) References Cited

U.S. PATENT DOCUMENTS

| | | | | |
|---|---|---|---|---|
| H1772 H | * | 1/1999 | Akahane | 340/825.22 |
| 6,100,792 A | * | 8/2000 | Ogino et al. | 340/426.25 |
| 6,246,863 B1 | * | 6/2001 | Kampel | 455/100 |
| 6,992,566 B2 | * | 1/2006 | Striemer | 340/10.1 |
| 7,046,119 B2 | * | 5/2006 | Ghabra et al. | 340/5.72 |
| 2005/0111401 A1 | * | 5/2005 | Terry | 370/328 |

FOREIGN PATENT DOCUMENTS

JP 2001-295524 A 10/2001

* cited by examiner

*Primary Examiner*—Jeff Hofsass
*Assistant Examiner*—Ojiako Nwugo
(74) *Attorney, Agent, or Firm*—Crompton, Seager & Tufte, LLC

(57) ABSTRACT

A portable device for facilitating adjustment of the area in which communication with a controller is enabled. The portable device performs wireless communication with an in-vehicle device, which controls a door lock driver or an engine starter of a vehicle, to remotely control the in-vehicle device. The portable device includes a receiver for receiving a request signal from the in-vehicle device and a control unit for lowering or raising the signal receiving sensitivity of the receiver by predetermined levels to adjust the signal receiving sensitivity.

19 Claims, 7 Drawing Sheets

PORTABLE DEVICE

BACKGROUND OF THE INVENTION

The present invention relates to a portable device for remotely operating a predetermined subject such as a vehicle device installed in a vehicle.

Japanese Laid-Open Patent Publication No. 2001-295524 describes a system that remotely controls a predetermined subject through wireless communication. In this remote control system, wireless communication is performed between a portable device and an in-vehicle device to automatically lock and unlock the vehicle door or to enable starting of the engine. More specifically, the in-vehicle device transmits a request signal to a predetermined area around the vehicle or to a predetermined area in the passenger compartment. When receiving the request signal, the portable device automatically transmits an ID code signal, which includes an ID code uniquely set for the portable device, to the in-vehicle device. When receiving the ID code signal, the in-vehicle device compares the ID code of the received ID code with its own ID code. When the ID codes are identical, the in-vehicle device automatically unlocks the vehicle door or enables the starting of the engine.

To execute control for automatically locking and unlocking the door, the request signal must be transmitted to the predetermined area around the vehicle. In other words, communication must be enabled between the portable device and the in-vehicle device in the predetermined area. Further, to execute control for enabling starting of the engine, transmission of the request signal must be limited to within the passenger compartment. Communication must be enabled between the portable device and the in-vehicle device in the passenger compartment. It is thus required that such communication areas be set with high accuracy. However, the communication area may not be set as designed due to errors in signal transmission and receiving accuracy of the portable device or in-vehicle device.

Accordingly, in the remote control system described in Japanese Laid-Open Patent Publication No. 2001-295524, the in-vehicle device adjusts the output intensity of the request signal. This optimizes the area in which communication is enabled between the portable device and the in-vehicle device.

To control starting enablement of the engine, transmission of the request signal must be limited to within the passenger compartment. Further, the passenger compartment must be an area in which communication between the portable device and the in-vehicle device is enabled. Additionally, communication must be enabled in the entire passenger compartment so that the engine can be started regardless of where the portable device is located in the passenger compartment. Thus, to set the optimal transmission area of the request signal, various measures must be taken. For example, directivity must be applied to the request signal or a plurality of transmitter antennas must be used to transmit the request signal.

Accordingly, various measures must be taken when optimizing the area in which communication between the portable device and the in-vehicle device is enabled before adjusting the output intensity of the request signal as described in Japanese Laid-Open Patent Publication No. 2001-295524. Further, the output intensity of the request signal must be adjusted in accordance with the shape of the request signal transmission area. Therefore, it difficult to adjust the output intensity of the request signal and optimize the communication area between the portable device and the in-vehicle device.

Additionally, transmission of the request signal at maximum output may not be allowed due to regulations under radio wave laws. In such a case, noise tends to mix with the request signal. Further, the noise resistance capacity of the request signal may be decreased.

In addition to vehicles, the remote control system may be embodied, for example, in a home door lock control system. In such a case, a door controller (corresponding to the in-vehicle device) is installed in a door. The door controller transmits a request signal to a predetermined area near the door. However, the same problem as the vehicle remote control system occurs when changing the output intensity of the request signal since doors have difference shapes and sizes.

SUMMARY OF THE INVENTION

It is an object of the present invention to provide a portable device that facilitates and ensures the adjustment of an area in which communication with a controller is enabled.

One aspect of the present invention is a portable device for performing wireless communication with a controller, which controls a predetermined controlled subject, and remotely controlling the controller. The portable device includes a receiver for receiving a transmission signal from the controller. The receiver has an adjustable signal receiving sensitivity. A control unit, connected to the receiver, lowers or raises the signal receiving sensitivity of the receiver by a predetermined level.

A further aspect of the present invention is a remote control system including a controller for controlling a predetermined controlled subject. A portable device performs wireless communication with the controller and remotely controls the controller. The portable device includes a receiving means for receiving a transmission signal from the controller. The receiving means has an adjustable signal receiving sensitivity. A sensitivity adjustment means, connected to the receiving means, lowers or raises the signal receiving sensitivity of the receiving means by a predetermined level.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A vehicle remote control system 1 according to a preferred embodiment of the present invention will now be described with reference to FIGS. 1 to 7.

Figure 1:
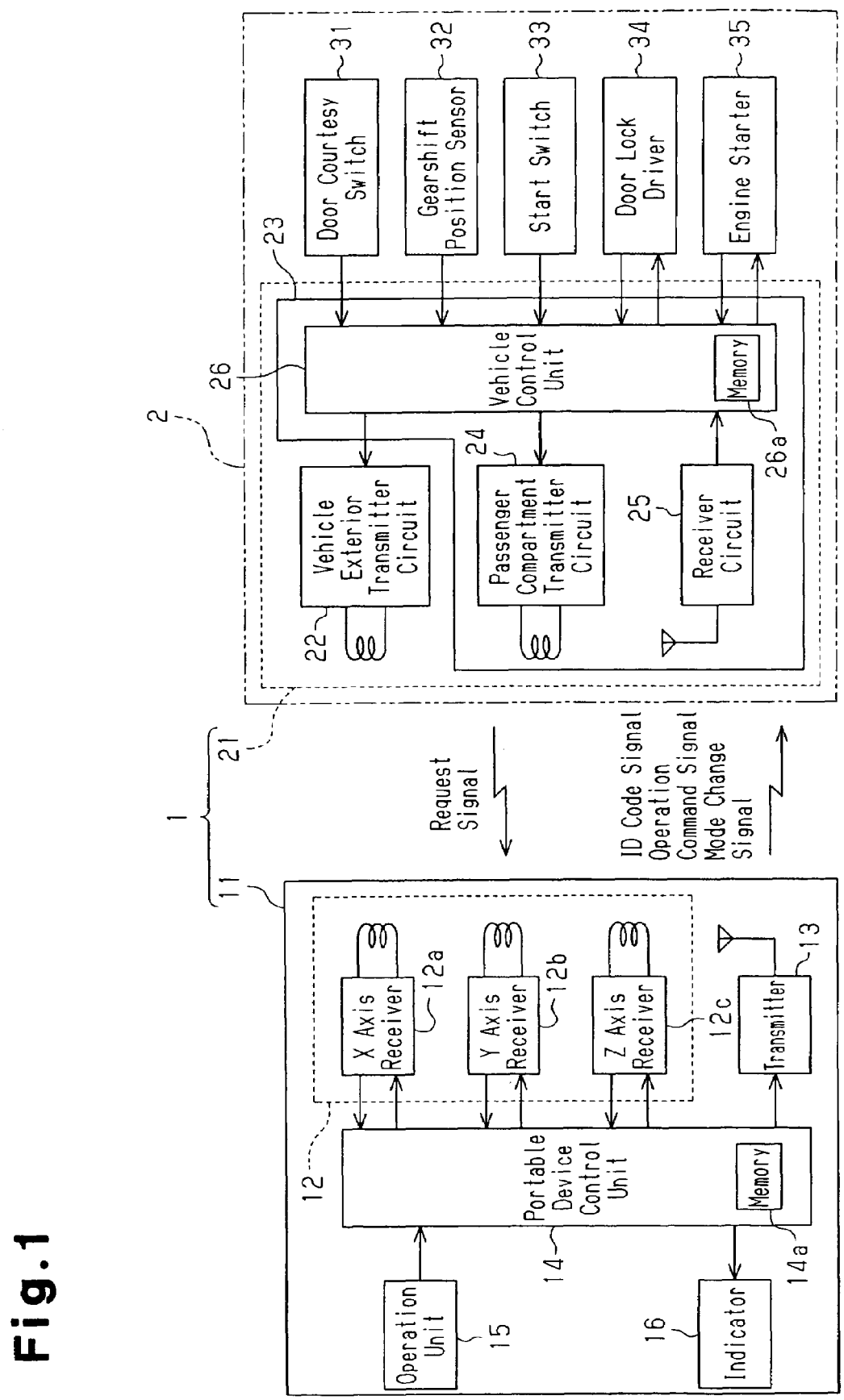
FIG. 1 is a schematic block diagram showing the structure of a vehicle remote control system according to a preferred embodiment of the present invention.
Figure 2:
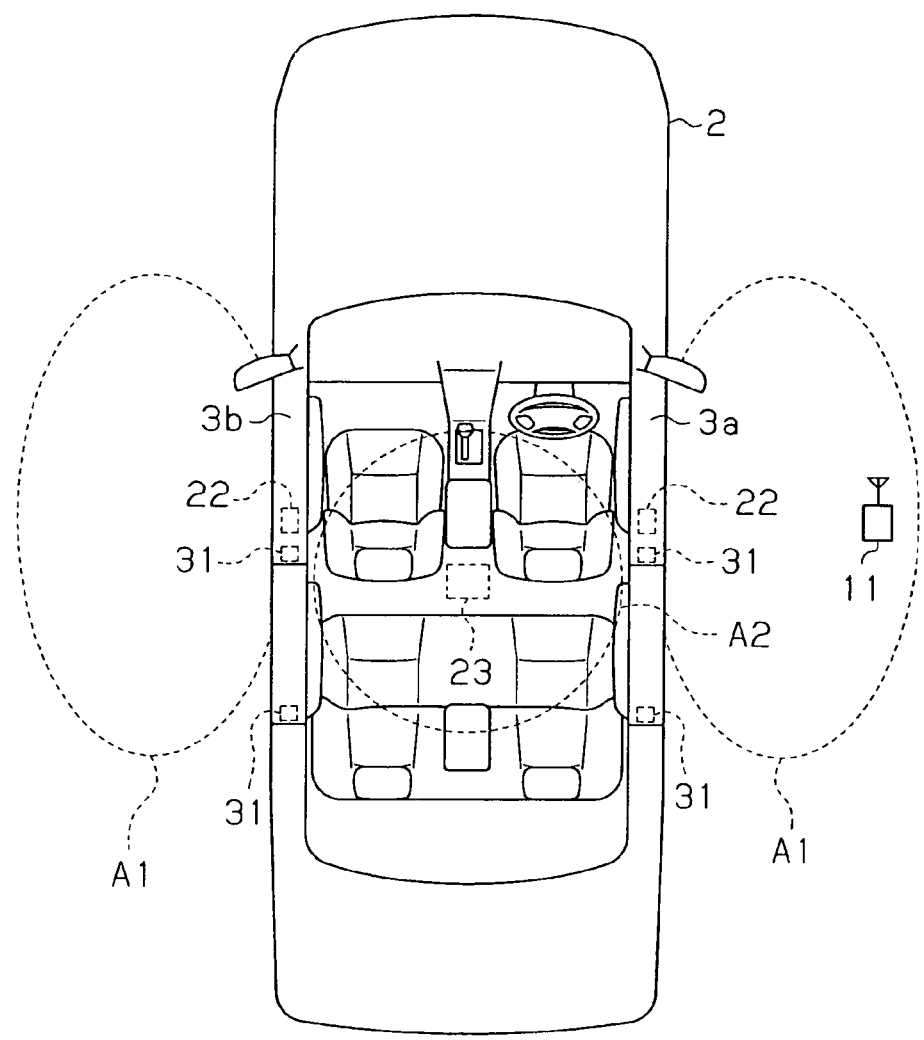
FIG. 2 is a schematic plan view showing a vehicle provided with the remote control system shown in FIG. 1.

Referring to FIGS. 1 and 2, the remote control system 1 includes a portable device 11, which is carried by an owner (driver) of a vehicle 2, and an in-vehicle device 21, which is installed in the vehicle 2.

As shown in FIG. 1, the portable device 11 includes a receiver 12, a transmitter 13, a portable device control unit. 14, an operation unit 15, and an indicator 16. The receiver 12, the transmitter 13, the operation unit 15, and the indicator 16 are each electrically connected to a portable device control unit 14.

The receiver 12, which functions as a receiving means, includes an X axis receiver unit 12a, a Y axis receiver unit 12b, and a Z axis receiver unit 12c. The receiver units 12a, 12b, and 12c are each defined by an independent receiver circuit, which is provided with a receiver antenna. The receiver antennas of the receiver units 12a, 12b, and 12c have directivities in directions orthogonal to one another. When receiving a vehicle exterior request signal or passenger compartment request signal from the in-vehicle device 21, the receiver units 12a, 12b, and 12c each demodulate the request signal to a pulse signal, which is output to a portable device control unit 14. Further, the receiver units 12a, 12b, and 12c each include an attenuator (not shown), which changes the signal receiving sensitivity in accordance with its the attenuation rate. The portable device control unit 14 controls the attenuator. Thus, the signal receiving sensitivity of each of the receiver units 12a, 12b, and 12c is controlled by the portable device control unit 14. Accordingly, the portable device control unit 14 functions as a sensitivity adjustment means.

The transmitter 13 modulates an ID code signal and operation command signal output from the portable device control unit 14 to a wireless signal having a predetermined frequency (in this case, 314 MHz). Then, the transmitter 13 transmits the modulated signal.

Figure 3:
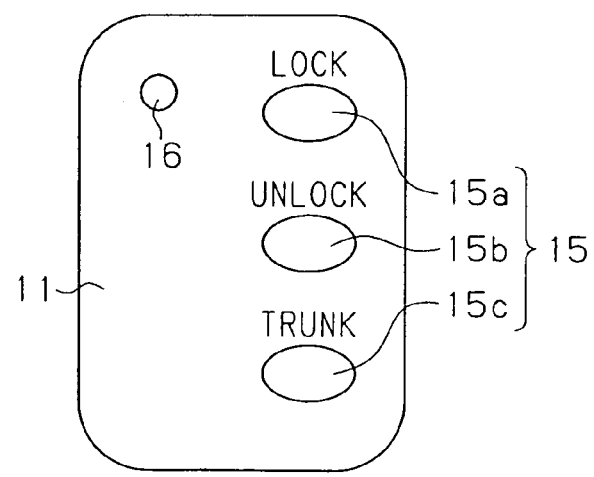
FIG. 3 is a front view showing a portable device of the preferred embodiment.

The operation unit 15 includes button switches arranged on the outer surface of the portable device 11. The operation of a button switch generates a corresponding operation signal, which is sent to the portable device control unit 14. In the preferred embodiment, the operation unit 15 includes three button switches (lock switch 15a, unlock switch 15b, and trunk switch 15c) arranged on the outer surface of a case 11a of the portable device 11, as shown in FIG. 3. The lock switch 15a is pushed to send a lock operation signal to the portable device control unit 14. The unlock switch 15b is pushed to send an unlock operation signal to the portable device control unit 14. The trunk switch 15c is pushed to send a trunk operation signal to the portable device control unit 14.

Referring to FIG. 3, the indicator 16 is formed by an LED or the like arranged on the case 11a. The indicator 16 is illuminated when receiving an activation signal from the portable device control unit 14.

The portable device control unit 14, which is a central processing unit including a ROM and a RAM (not shown), is provided with a nonvolatile memory 14a. The memory 14a stores a unique ID code, a lock code, an unlock code, a trunk code, and a parameter, which indicates the attenuation rate for increasing or decreasing the signal receiving sensitivity of the receiver 12 by a predetermined level. When receiving the vehicle exterior request signal or passenger compartment request signal from the receiver 12, the portable device control unit 14 sends a transmission signal (ID code signal), which includes an ID code, to the transmitter 13. When receiving an operation signal from the operation unit 15, the portable device control unit 14 sends an operation command signal, which includes an operation command code corresponding to the operation signal, to the transmitter 13. More specifically, when receiving the lock operation signal from the lock switch 15a, the portable device control unit 14 sends a lock command signal, which includes the ID code and a lock code, to the transmitter 13. When receiving the unlock operation signal from the unlock switch 15b, the portable device control unit 14 sends an unlock command signal, which includes the ID code and an unlock code, to the transmitter 13. Further, when receiving the trunk operation signal from the trunk switch 15c, the portable device control unit 14 sends a trunk command signal, which includes the ID code and a trunk code, to the transmitter 13.

The in-vehicle device 21 includes vehicle exterior transmitter circuits 22 and a controller 23. As shown in FIG. 2, the vehicle exterior transmitter circuits 22 are arranged in a driver side door 3a and a passenger side door 3b. Each vehicle exterior transmitter circuit 22 includes a transmitter antenna, converts the vehicle exterior request signal output from the controller 23 to a wireless signal having a predetermined frequency (in this case, 134 kHz), and transmits the wireless signal to a predetermined area near the vehicle. The vehicle exterior request signal is transmitted to areas A1 near the driver side door 3a and the passenger side door 3b.

The controller 23 is located near the middle of the vehicle 2 and electrically connected to the vehicle exterior transmitter circuits 22. As shown in FIG. 1, the controller 23 includes a passenger compartment transmitter circuit 24, a receiver circuit 25, and a vehicle control unit 26.

The passenger compartment transmitter circuit 24 includes a transmitter antenna, converts the passenger compartment request signal output from the controller 23 to a wireless signal having a predetermined frequency (in this case, 134 kHz), and transmits the wireless signal to a predetermined area in the passenger compartment of the vehicle. As shown in FIG. 2, the passenger compartment request signal is transmitted to area A2, which is limited to within the passenger compartment.

The receiver circuit 25, which includes a receiver antenna, receives an ID code signal and operation command signal from the portable device 11. The receiver circuit 25 demodulates the ID code signal and operation command signal to pulse signals and sends the demodulated pulse signals to the vehicle control unit 26.

The vehicle control unit 26, which is a central processing unit including a ROM and a RAM (not shown), is provided with a nonvolatile memory 26a. The memory 26a stores a predetermined ID code, a lock code, an unlock code, a trunk code. The vehicle control unit 26 sends the vehicle exterior request signal to the vehicle exterior transmitter circuit 22 and the passenger compartment request signal to the passenger compartment transmitter circuit 24.

Further, the vehicle control unit 26 is electrically connected to door courtesy switches 31, a gearshift position sensor 32, a start switch 33, a door lock driver 34, and an engine starter 35. A door courtesy switch 31 is arranged in each door of the vehicle 2, such as the driver side door 3a or the passenger side door 3b, to detect whether the associated door is open or closed. The gearshift position sensor 32 is located near the gearshift lever to detect the gearshift position of the vehicle 2. The start switch 33 is a switch for starting the engine and arranged near the driver's seat. When operated by the driver, the start switch 33 sends a corresponding operation signal to the vehicle control unit 26. The door lock driver 34 includes an actuator for locking and unlocking the vehicle doors. Further, the door lock driver 34 drives the actuator when receiving an electric signal. The engine starter 35 drives a starter motor (not shown) when receiving a drive command signal from the vehicle control unit 26.

When the receiver circuit 25 receives an ID code signal, which is transmitted from the portable device 11 in response to the vehicle exterior request signal or passenger compartment request signal, the vehicle control unit 26 compares the ID code included in the ID code signal with the ID code stored in the memory 26a to perform ID code authentication. If the two ID codes are identical, the vehicle control unit 26 sends an unlock drive signal to the door lock driver 34 to unlock the vehicle doors. When the ID code signal is no longer received, the vehicle control unit 26 sends a lock drive signal to the door lock driver 34 to lock the vehicle doors. If the ID code signal is received in response to the passenger compartment request signal, the vehicle control unit 26 enables starting of the engine. In this state, if an operation signal is received from the start switch 33 and it can be confirmed with the signal received from the gearshift position sensor 32 that the gearshift lever is located at a non-driving position such as the parking (P) position or the neutral (N) position, the vehicle control unit 26 outputs a drive command signal to start the engine.

When the receiver circuit 25 receives an operation command signal, the vehicle control unit 26 compares the ID code included in the operation command signal with the ID code stored in the memory 26a. If the ID codes are identical, the vehicle control unit 26 compares the operation command code included in the operation command signal with operation command codes (lock code, unlock code, trunk code) stored in the memory 26a to find an identical code. Then, the vehicle control unit 26 locks the vehicle doors, unlocks the vehicle doors, or unlocks the trunk in accordance with the identical code.

Figure 4:
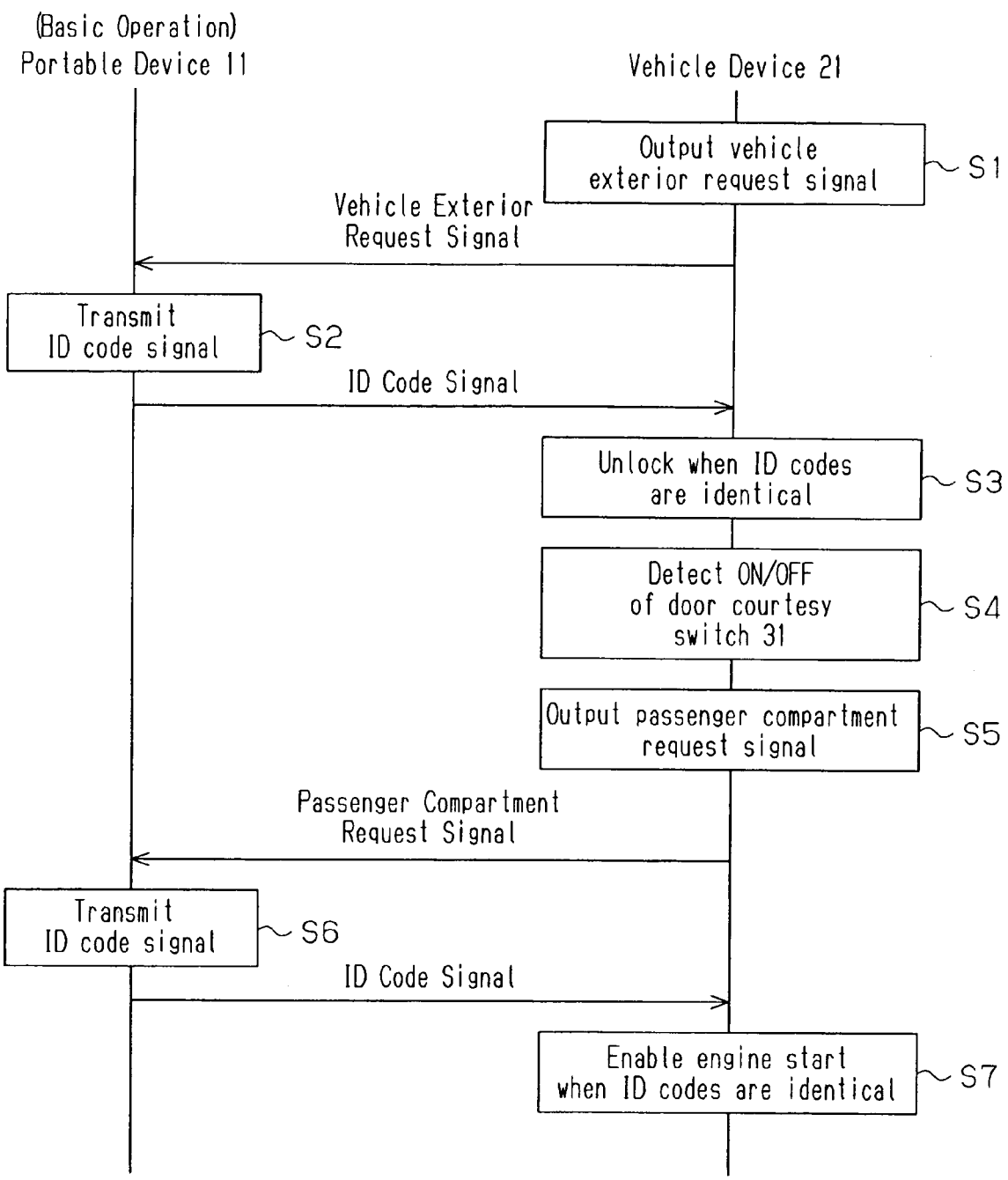
FIG. 4 is a sequence chart showing the basic operation of the remote control system shown in FIG. 1.

The basic operation of the vehicle remote control system 1 will now be discussed with reference to the sequence chart of FIG. 4.

In step S1, the in-vehicle device 21 transmits the vehicle exterior request signal. The request signal is transmitted to areas A1 near the vehicle as shown in FIG. 2. In step S2, when the portable device 11 is held near the vehicle 2 and receives the vehicle exterior request signal, the portable device 11 transmits the ID code signal. When receiving the ID code signal, the in-vehicle device 21 performs ID code authentication. In step S3, if the ID codes are identical, the in-vehicle device 21 unlocks the vehicle doors.

When holding the portable device 11, the driver may lock or unlock the vehicle doors without performing any operations just by approaching or moving away from the vehicle 2.

Then, in step S4, when the opening and closing of a door is detected from the door courtesy switch 31, the in-vehicle device transmits the passenger compartment request signal in step S5. The request signal is transmitted to area A2, which is limited to within the passenger compartment. In step S6, when the portable device 11 held by the driver enters the passenger compartment and receives the passenger compartment request signal, the portable device 11 transmits the ID code signal. When receiving the ID code signal, the in-vehicle device 21 performs ID code authentication. In step S7, the starting of the engine is enabled if the ID codes are identical. Thus, the starting of the engine is enabled only when the driver holding the portable device 11 enters the passenger compartment of the vehicle 2. Accordingly, without the portable device 11, the starting of the engine is disabled.

When at least one of the operation signals satisfies a predetermined condition, the portable device control unit 14 of the portable device 11 switches from a normal mode to a sensitivity adjustment mode. In the preferred embodiment, the portable device control unit 14 switches to the sensitivity adjustment mode when simultaneously receiving all of the operation signals for a predetermined time or longer. More specifically, the portable device control unit 14 switches to the sensitivity adjustment mode when the switches 15a, 15b, and 15c are simultaneously operated for a predetermined time (e.g., one second) or longer, that is, when a person holding the portable device 11 operates the switches 15a, 15b, and 15c in accordance with a predetermined procedure.

After switching to the sensitivity adjustment mode, the portable device control unit 14 sends a mode change signal to the transmitter 13. The mode change signal includes a command code for having either one of the vehicle exterior request signal and the passenger compartment request signal transmitted from the in-vehicle device 21. When receiving the mode change signal, the transmitter 13 modulates the mode change signal to a wireless signal and transmits the wireless signal out of the portable device 11. In the preferred embodiment, after switching to the sensitivity adjustment mode, when the lock switch 15a of the operation unit 15 is operated for a predetermined time (e.g., one second) or longer, the portable device control unit 14 transmits a mode change signal including a command code (vehicle exterior transmission command code) for having the vehicle exterior request signal transmitted. Further, after switching to the sensitivity adjustment mode, when the unlock switch 15b is operated for a predetermined time (e.g., one second) or longer, the portable device control unit 14 transmits a mode change signal including a command code (passenger compartment transmission command code) for having the passenger compartment request signal transmitted. If the switches 15a and 15b are not operated after switching to the sensitivity adjustment mode, the portable device control unit 14 cancels the sensitivity adjustment mode and switches to the normal mode.

After switching to the sensitivity adjustment mode, the portable device control unit 14 sets only the X axis receiver unit 12a to a signal receivable state. Further, the portable device control unit 14 sets the signal receiving sensitivity of the X axis receiver unit 12a to the maximum level. When receiving an operation signal from the lock switch 15a of the operation unit 15, the portable device control unit 14 lowers the signal receiving sensitivity of the X axis receiver unit 12a by a predetermined level based on a parameter stored in the memory 14a.

More specifically, the portable device control unit 14 sends a sensitivity adjustment signal to the X axis receiver unit 12a. This results in the attenuator of the X axis receiver unit 12a attenuating the signal receiving sensitivity in accordance with an attenuation rate that is based on a parameter stored in the memory 14a. If an operation signal is received from the unlock switch 15b of the operation unit 15, the portable device control unit 14 raises the signal receiving sensitivity of the X axis receiver unit 12a by the predetermined level.

If the trunk switch 15c is operated for a predetermined time (e.g., one second) or longer, the portable device control unit 14 switches from a state in which only the X axis receiver unit 12a is enabled to receive a signal to a state in which only the Y axis receiver unit 12b is enabled to receive a signal. If the trunk switch 15c is again operated for a predetermined time or longer, the portable device control unit 14 switches from a state in which only the Y axis receiver unit 12b is enabled to receive a signal to a state in which only the Z axis receiver unit 12c is enabled to receive a signal. In other words, whenever the trunk switch 15c is operated, the portable device control unit 14 sequentially sets only the X axis receiver unit 12a to a signal receivable state, only the Y axis receiver unit 12b to a signal receivable state, and then only the Z axis receiver unit 12c to a signal receivable state.

Then, when the switches 15a, 15b, and 15c are simultaneously operated for a predetermined time (e.g., one second) or longer, the portable device control unit 14 sends a mode change signal, which includes a command code (normal mode command code) for switching to the normal mode, to the transmitter 13. This switches the portable device 11 from the sensitivity adjustment mode to the normal mode.

During the sensitivity adjustment mode, when the portable device control unit 14 receives a request signal from the receiver 12, the portable device control unit 14 sends an activation signal to the indicator 16. This illuminates the indicator 16.

When receiving the mode change signal, the receiver circuit 25 of the in-vehicle device 21 modulates the mode change signal to a pulse signal, which is sent to the vehicle control unit 26. The vehicle control unit 26 switches from the normal mode to the sensitivity adjustment mode and selectively outputs one of the vehicle exterior request signal and the passenger compartment request signal in accordance with the mode change signal. More specifically, when the mode change signal includes the vehicle exterior transmission command code, the vehicle control unit 26 sends a request signal to the vehicle exterior transmitter circuit 22. Thus, in this case, the request signal is transmitted to areas A1 located near the vehicle 2. When the mode change signal includes the passenger compartment transmission command code, the vehicle control unit 26 outputs a request signal to the passenger compartment transmitter circuit 24. In this case, the request signal is transmitted to area A2 located in the passenger compartment of the vehicle 2.

The vehicle control unit 26 switches to the normal mode and performs normal operations when the mode change signal includes the normal mode command code.

An example of the sensitivity adjustment performed with the portable device 11 will now be described with reference to FIGS. 5 to 7. In this case, the sensitivity adjustment is performed outside the vehicle with the portable device 11.

Figure 7:
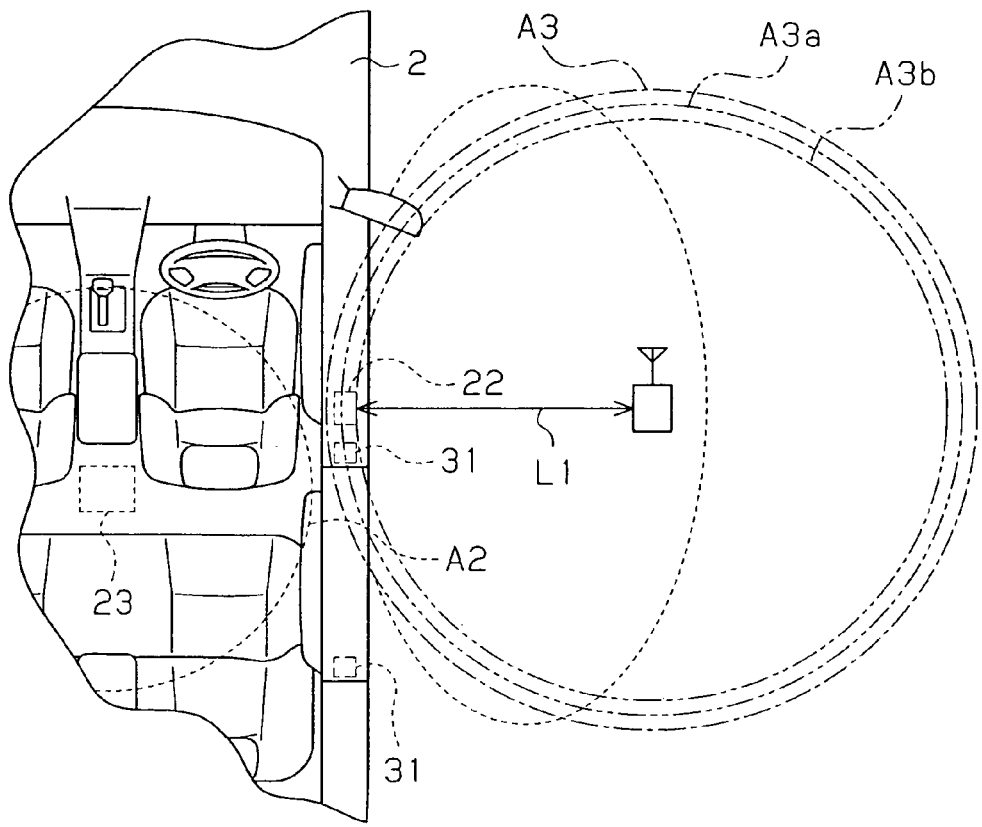
FIG. 7 is a schematic diagram showing changes in the signal receiving area of the portable device in the preferred embodiment.

Referring to FIG. 7, the portable device 11 is held at a position separated by, for example, a predetermined distance L1 from the vehicle 2. The predetermined distance L1 is the optimal maximum distance in which communication between the portable device 11 and the in-vehicle device 21 is enabled around the vehicle 2. That is, in an optimal state, at positions separated further than the predetermined distance L1 from the vehicle 2, communication between the portable device 11 and the in-vehicle device 21 would be disabled. Thus, the predetermined distance L1 is the optimal limit for communication between the portable device 11 and the in-vehicle device 21.

Figure 5:
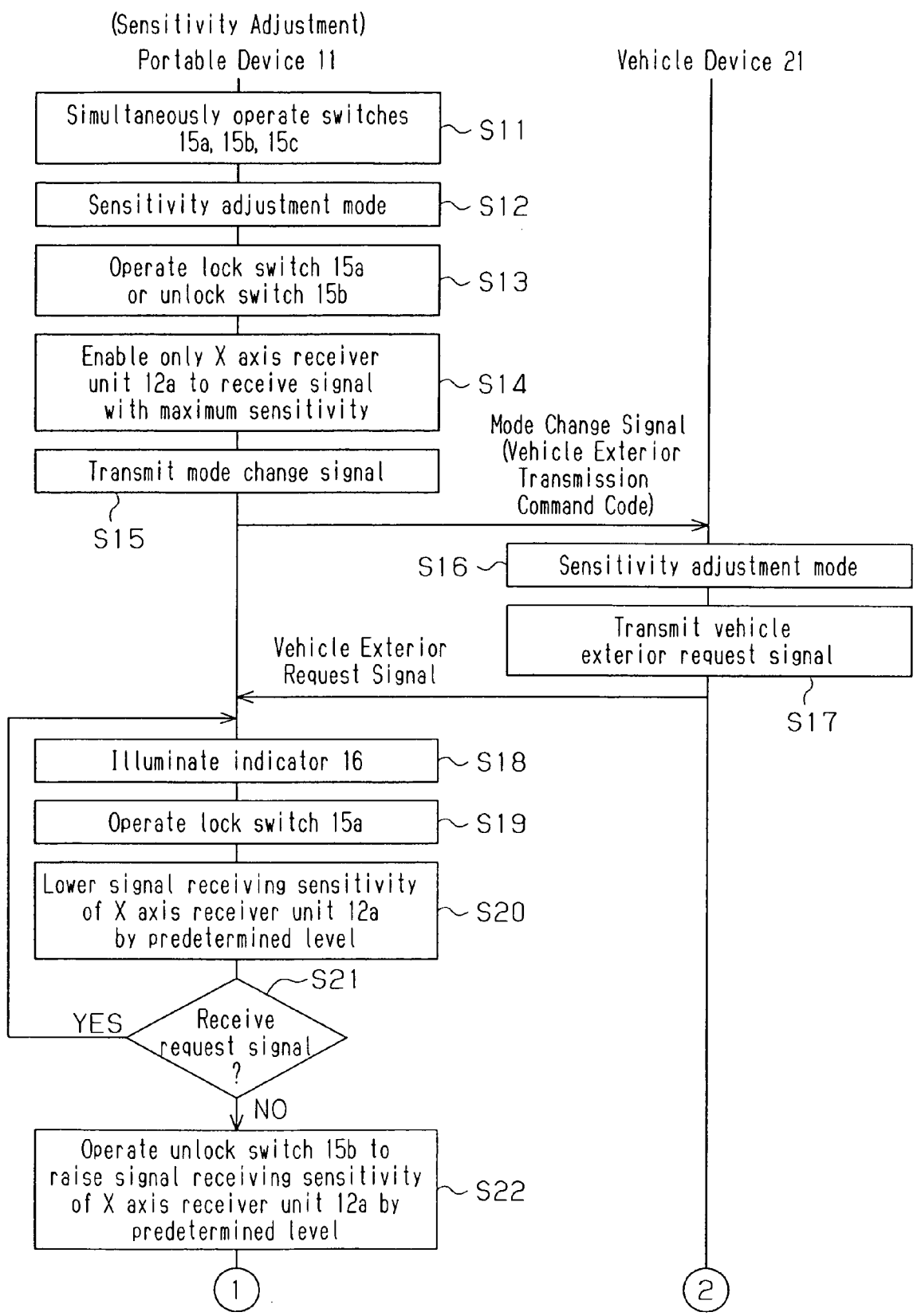
FIG. 5 is a sequence chart showing the procedures for adjusting sensitivity in the remote control system shown in FIG. 1.
Figure 6:
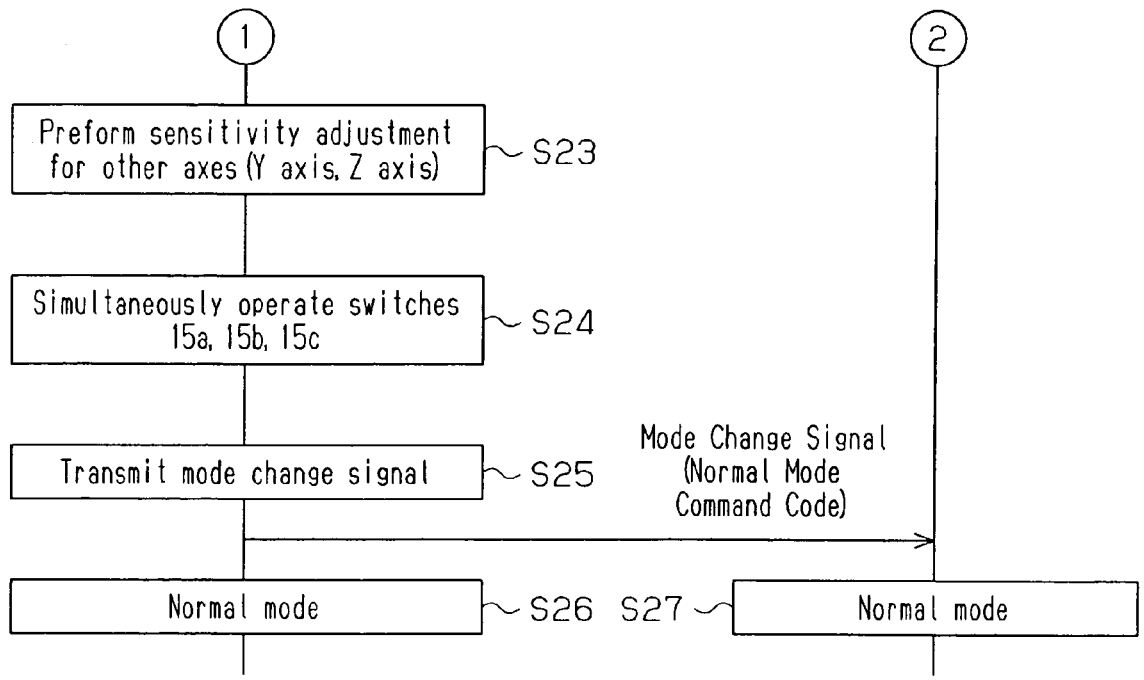
FIG. 6 is a sequence chart showing the procedures for adjusting sensitivity in the remote control system shown in FIG. 1.

Referring to step S11 in FIG. 5, when the portable device 11 is held at a position separated by the predetermined distance L1 from the vehicle 2, the switches 15a, 15b, and 15c of the portable device 11 are simultaneously operated for a predetermined time. As a result, in step S12, the portable device 11 switches from the normal mode to the sensitivity adjustment mode. Then, in step S13, when the lock switch 15a or the unlock switch 15b is operated (in this example, the lock switch 15a is operated), in step S14, the portable device 11 enables only the X axis receiver unit 12a to receive a signal. Further, the portable device 11 sets the signal receiving sensitivity of the X axis receiver unit 12a to the maximum level. In step S15, the portable device 11 transmits a mode change signal that includes the vehicle exterior transmission command code. In FIG. 7, the signal receivable area of the X axis receiver unit 12a at the maximum sensitivity level is as indicated by area A3.

In step S16, the in-vehicle device 21 switches to the sensitivity adjustment mode when receiving the mode change signal. In step S17, the in-vehicle device 21 transmits the vehicle exterior request signal.

When receiving the vehicle exterior request signal from the in-vehicle device 21, in step S18, the portable device 11 illuminates the indicator 16. This enables the person adjusting the sensitivity to visually confirm that the portable device 11 is receiving the request signal.

When the lock switch 15a is operated in step S19, the portable device 11 raises the attenuation rate of the attenuator in the X axis receiver unit 12a and lowers the signal receiving sensitivity by a predetermined level in step S20. As a result, as shown in FIG. 7, the signal receivable area of the X axis receiver unit 12a is reduced to area A3a from area A3.

In step S21, if the portable device 11 is still receiving the vehicle exterior signal (YES), the portable device 11 proceeds to step S18 and illuminates the indicator 16. In this manner, the lock switch 15a is operated to lower the signal receiving sensitivity of the X axis receiver unit 12a until the portable device 11 cannot receive the vehicle request signal. If the portable device 11 can no longer receive the vehicle exterior request signal (NO in step S21), that is, when the signal receivable area of the X axis receiver unit 12a is reduced to area A3b as indicated in FIG. 7, in step S22, the person adjusting the sensitivity operates the unlock switch 15b to raise the signal receiving sensitivity of the X axis receiver unit 12a by the predetermined level. This enlarges the signal receivable area from area A3b to area A3a. In this manner, the sensitivity for receiving the external request signal is set at the limit in which the vehicle request signal can be received. Thus, at positions separated from the vehicle 2 by more than the predetermined distance L1, the vehicle exterior signal cannot be received.

In step S23 (FIG. 6), the trunk switch 15c is operated so that the portable device 11 enables only the Y axis receiver unit 12b to receive a signal or the Z axis receiver unit 12c to receive a signal. Then, the processes of steps S18 to S22 are repeated to adjust the signal receiving sensitivity.

In this manner, after the signal receiving sensitivity is adjusted for each of the receiver units 12a, 12b, and 12c, in step S24, the switches 15a, 15b, and 15c are simultaneously operated for a predetermined time. As a result, in step S25, the portable device 11 transmits a mode change signal including the normal mode command code. Then, in step S26, the portable device 11 switches to the normal mode. Further, in step S27, the in-vehicle device 21 also switches to the normal mode when receiving the mode change signal.

In this example, the signal receiving sensitivity of the portable device 11 with respect to the vehicle exterior request signal is adjusted. However, in step S13, operation of the unlock switch 15b would enable the signal receiving sensitivity adjustment of the portable device 11 with respect to the passenger compartment request signal. Thus, the signal receiving sensitivity of the portable device 11 in the passenger compartment of the vehicle 2 is also enabled.

The preferred embodiment has the advantages described below.

(1) The operation unit 15 of the portable device 11 is operated in a predetermined manner so that the portable device control unit 14 switches to the sensitivity adjustment mode. In the sensitivity adjustment mode, the operation unit 15 is further operated to adjust the signal receiving sensitivity of the receiver 12. Therefore, the area in which communication is enabled between the portable device 11 and the in-vehicle device 21 is adjusted with the portable device 11 without changing the output intensity of the request signal transmitted from the in-vehicle device 21. This eliminates the need for adjusting the output intensity of the request signal in accordance with the shape of the request signal transmission area. Accordingly, the adjustment of the communication area is facilitated in comparison to when adjusting the output intensity of the request signal transmitted from the in-vehicle device 21. Further, the request signal may be transmitted at the maximum output permitted by the radio wave law. Thus, the request noise resists the mixture of noise. Further, communication is prevented from being disabled between the portable device 11 and the in-vehicle device 21.

(2) The portable device control unit 14 of the portable device 11 switches to the sensitivity adjustment mode only when the operation unit 15 is operated in a predetermined manner. Thus, the signal receiving sensitivity is adjusted only when the person performing such adjustment intends to do so. This prevents the portable device control unit 14 from being unintentionally shifted to the sensitivity adjustment mode.

(3) The signal receiving sensitivity of the receiver 12 is gradually lowered or raised in accordance with the number of times the operation unit 15 is operated. This enables fine adjustment of the signal receiving sensitivity of the receiver 12. That is, fine adjustment of the communication area of the portable device 11 and the in-vehicle device 21 is enabled.

It should be apparent to those skilled in the art that the present invention may be embodied in many other specific forms without departing from the spirit or scope of the invention. Particularly, it should be understood that the present invention may be embodied in the following forms.

In the preferred embodiment, when switching to the sensitivity adjustment mode, the portable device control unit 14 of the portable device 11 first sets the sensitivity of the receiver 12 at the maximum level (refer to step S14 in FIG. 5). However, when switching to the sensitivity adjustment mode, the portable device control unit 14 may first set the sensitivity of the receiver 12 at the minimum level. In this case, the unlock switch 15b is operated to gradually raise the signal receiving sensitivity of the receiver 12. Further, less power is consumed by the portable device 11 during sensitivity adjustment than in the preferred embodiment.

Figure 8:
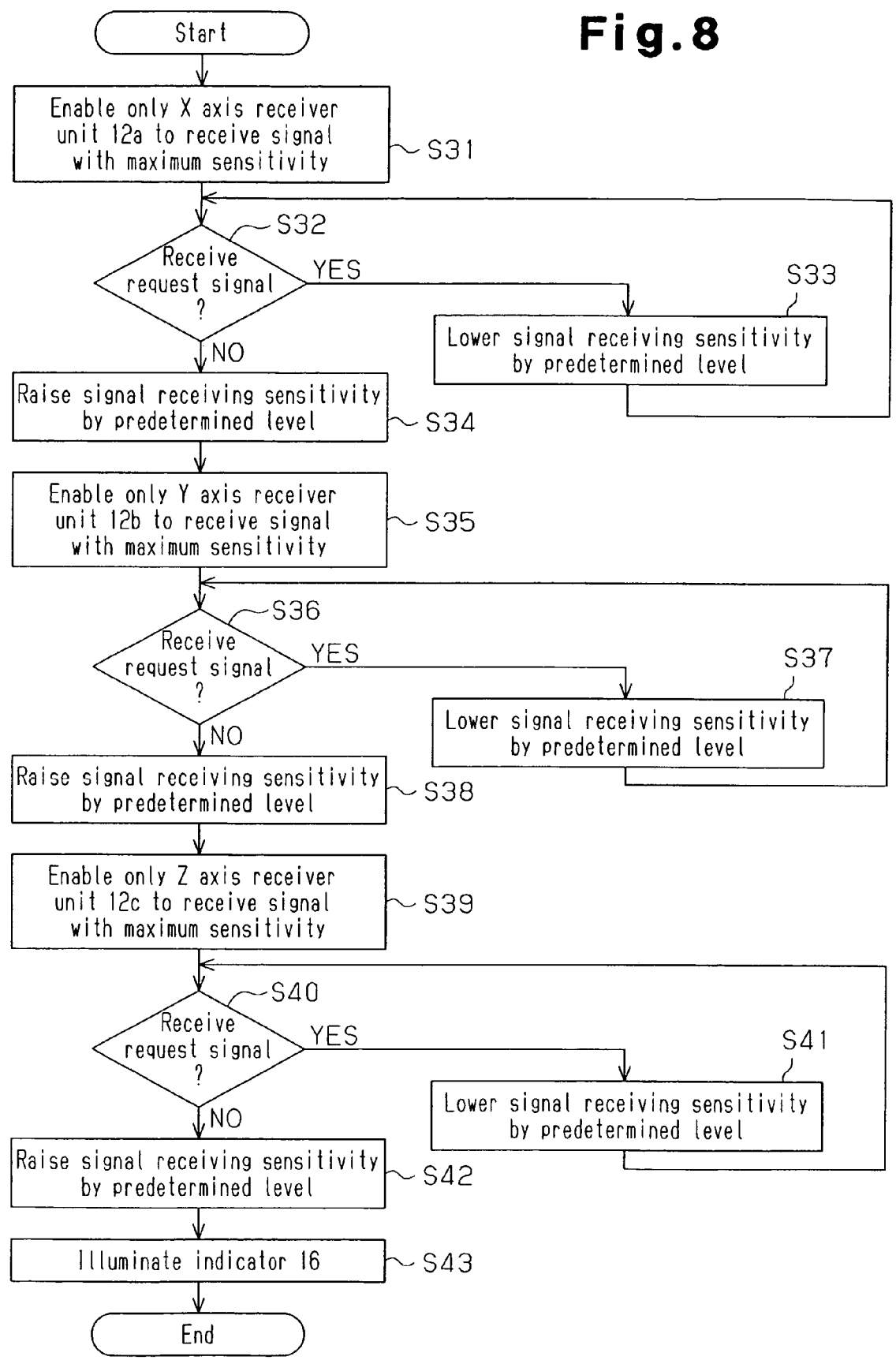
FIG. 8 is a flowchart showing sensitivity adjustment control executed by a remote control system according to another embodiment of the present invention.

In the preferred embodiment, the sensitivity adjustment for the receiver 12 of the portable device 11 is manually performed by operating the lock switch 15a or unlock switch 15b. Instead, the portable device control unit 14 may automatically perform the sensitivity adjustment of the receiver 12. An example of automatic adjustment control performed by the portable device control unit 14 will now be described with reference to the flowchart of FIG. 8. In this example, the signal receiving sensitivity of the receiver 12 is adjusted by gradually decreasing the signal receiving sensitivity of the receiver 12 from the maximum level.

After switching to the sensitivity adjustment mode by simultaneously operating the switches 15a, 15b, and 15c for a predetermined time, in step S31, the portable device control unit 14 enables only the X axis receiver unit 12a to receive a signal. Further, the portable device control unit 14 sets the receiving sensitivity of the X axis receiver unit 12a to the maximum level.

Then, in step S32, the portable device control unit 14 determines whether or not the X axis receiver unit 12a is receiving the request signal. If the X axis receiver unit 12a is receiving the request signal, in step S33, the portable device control unit 14 lowers the signal receiving sensitivity of the X axis receiver unit 12a by a predetermined level. Then, the portable device control unit 14 performs the process of step S32 again. In this manner, the portable device control unit 14 repeats these processes until the X axis receiver unit 12a cannot receive the request signal. When the X axis receiver unit 12a can not longer receive the request signal, in step S34, the portable device control unit 14 raises the signal receiving sensitivity of the X axis receiver unit 12a by a predetermined level. In this manner, the portable device control unit 14 gradually lowers the signal receiving sensitivity of the X axis receiver unit 12a from the maximum level to automatically set the sensitivity for receiving the request signal at the limit in which the request signal can be received.

Next, in step S35, the portable device control unit 14 enables only the Y axis receiver unit 12b to receive a signal. Further, the portable device control unit 14 sets the signal receiving sensitivity of the Y axis receiver unit 12b at the maximum level. In steps S36 to S38, the portable device control unit 14 performs the same processes as in steps S32 to S34 to automatically set the signal receiving sensitivity of the Y axis receiver unit 12b.

After setting the signal receiving sensitivity of the Y axis receiver unit 12b, in step S39, the portable device control unit 14 enables only the Z axis receiver unit 12c to receive a signal. Further, the portable device control unit 14 sets the signal receiving sensitivity of the Z axis receiver unit 12c at the maximum level. In steps S40 to S42, the portable device control unit 14 performs the same processes as in steps S32 to S34 to automatically set the signal receiving sensitivity of the Z axis receiver unit 12c.

When completing the setting of the signal receiving sensitivity of the receiver units 12a, 12b, and 12c, in step S43, the portable device control unit 14 illuminates the indicator 16. This enables the person adjusting the sensitivity to visually confirm that the setting of the signal receiving sensitivity for the receiver 12 has been completed by glancing at the indicator 16.

When initiating the sensitivity adjustment control in step S32, if the request signal cannot be received even though the sensitivity of the X axis receiver unit 12a is at the maximum level, the portable device control unit 14 does not have to perform subsequent processing. In this case, the sensitivity adjustment control may be terminated.

As described above, the portable device control unit 14 automatically adjusts the signal receiving sensitivity of the receiver 12. This facilitates the adjustment of the signal receiving sensitivity for the receiver 12. In addition, the signal receiving sensitivity of the receiver 12 is gradually reduced in predetermined levels from the maximum level and set at the optimal level. Thus, when initiating-the sensitivity adjustment, the portable device control unit 14 can check whether or not the request signal transmitted from the in-vehicle device 21 is received by the receiver 12. This enables the portable device control unit 14 to execute the sensitivity adjustment control only when the receiver 12 can receive the request signal during initiation of the sensitivity adjustment control.

As a result, meaningless sensitivity adjustment control is not executed when the receiver 12 cannot receive the request signal.

Figure 9:
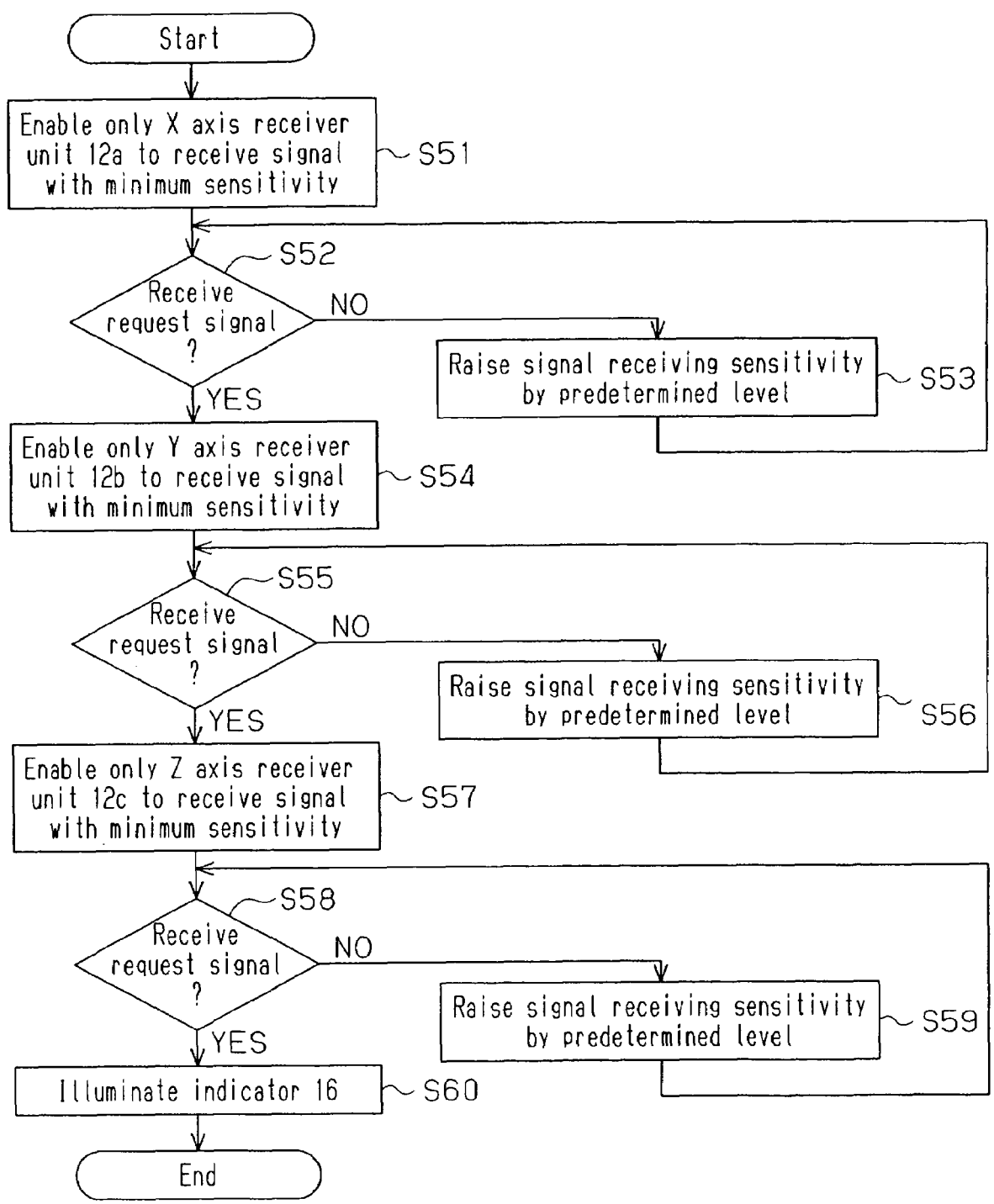
FIG. 9 is a flowchart showing sensitivity adjustment control executed by a remote control system according to a further embodiment of the present invention.

The control for automatically setting the sensitivity of the receiver 12 does not necessarily have to be executed by lowering the sensitivity from a high level to a low level. The automatic sensitivity setting control may be executed by gradually raising the sensitivity from the minimum level. An example in which the sensitivity is raised from a low level to a high level will now be discussed with reference to the flowchart of FIG. 9.

In step S51, the portable device control unit 14 enables only the X axis receiver unit 12a to receive a signal. Further, the portable device control unit 14 sets the receiving sensitivity of the X axis receiver unit 12a to the minimum level.

Then, in step S52, the portable device control unit 14 determines whether or not the X axis receiver unit 12a is receiving the request signal. If the X axis receiver unit 12a is not receiving the request signal, in step S53, the portable device control unit 14 raises the signal receiving sensitivity of the X axis receiver unit 12a by a predetermined level. Then, the portable device control unit 14 performs the process of step S52 again. In this manner, the portable device control unit 14 repeats these processes until the X axis receiver unit 12a can receive the request signal. When the X axis receiver unit 12a receives the request signal at a certain sensitivity level, the portable device control unit 14 sets the signal receiving sensitivity of the X axis receiver unit 12a at that level. In this manner, the portable device control unit 14 gradually raises the signal receiving sensitivity of the X axis receiver unit 12a from the minimum level to automatically set the sensitivity for receiving the request signal at the limit in which the request signal can be received.

Next, in step S54, the portable device control unit 14 enables only the Y axis receiver unit 12b to receive a signal. Further, the portable device control unit 14 sets the receiving sensitivity of the Y axis receiver unit 12b to the minimum level. Then, in steps S55 and S56, the portable device control unit 14 performs the same processes as in steps S52 and S53 to automatically set the signal receiving sensitivity of the Y axis receiver unit 12b.

After setting the signal receiving sensitivity of the Y axis receiver unit 12b, in step S57, the portable device control unit 14 enables only the Z axis receiver unit 12c to receive a signal. Further, the portable device control unit 14 sets the receiving sensitivity of the Z axis receiver unit 12c to the minimum level. Then, in steps S58 and S59, the portable device control unit 14 performs the same processes as in steps S52 and S53 to automatically set the signal receiving sensitivity of the Z axis receiver unit 12c.

When completing the setting of the signal receiving sensitivity of the receiver units 12a, 12b, and 12c, in step S60, the portable device control unit 14 illuminates the indicator 16. This enables the person adjusting the sensitivity to visually confirm that the setting of the signal receiving sensitivity for the receiver 12 has been completed by glancing at the indicator 16.

In this manner, the portable device control unit 14 automatically sets the signal receiving sensitivity of the receiver 12. This facilitates the adjustment of the signal receiving sensitivity for the receiver 12. In addition, the signal receiving sensitivity of the receiver 12 is set at the optimal level by raising the sensitivity from the minimum level in predetermined levels. This prevents noise from being received by the receiver 12 during sensitivity adjustment and prevents the setting of the signal receiving sensitivity from being affected by noise. Further, less power is consumed by the portable device 11 during the sensitivity adjustment.

The receiver 12 is not limited to a three-axis structure including the X axis receiver unit 12a, the Y axis receiver unit 12b, and the Z axis receiver unit 12c. The receiver 12 may be formed by only one or two receiver units.

In the preferred embodiment, the operation unit 15 for locking and unlocking the doors and trunk of the vehicle 2 is used to switch the portable device control unit 14 from the normal mode to the sensitivity adjustment mode and to raise or lower the signal receiving sensitivity of the receiver 12 in predetermined levels. However, such sensitivity adjustment may be performed by an exclusive operation unit provided separately from the operation unit 15.

The indicator 16 may be eliminated from the portable device 11.

When the portable device control unit 14 is switched to the sensitivity adjustment mode, the portable device 11 of the preferred embodiment transmits a mode change signal. In response to the mode change signal, the vehicle control unit 26 switches to the sensitivity adjustment mode. As a result, the vehicle control unit 26 only performs operations related with sensitivity adjustment. However, the vehicle control unit 26 does not necessarily have to be switched to the sensitivity adjustment mode. In such a case, the portable device 11 does not transmit the mode change signal.

In the preferred embodiment, the portable device 11 is used in the vehicle remote control system 1 to communicate with the in-vehicle device 21 arranged in the vehicle 2. However, the portable device 11 may be used in a remote control system for buildings to communicate with, for example, a home door lock system arranged in a door to a building.

The present examples and embodiments are to be considered as illustrative and not restrictive, and the invention is not to be limited to the details given herein, but may be modified within the scope and equivalence of the appended claims.

What is claimed is:

1. A portable device for performing wireless communication with a controller, which controls a predetermined controlled subject, and remotely controlling the controller, the portable device comprising:

a receiver for receiving a transmission signal from the controller in a plurality of predetermined areas, the receiver having an adjustable signal receiving sensitivity enabling receipt of the transmission signal and being selectively operable in a normal mode and a sensitivity adjustment mode;

a control unit, connected to the receiver, for lowering or raising the signal receiving sensitivity of the receiver by a predetermined level in the sensitivity adjustment mode in cooperation with the transmission signal when the portable device is located in a designated one of the predetermined areas to which the transmission signal is transmitted, wherein when in the sensitivity adjustment mode, the control unit finds a limit for the signal receiving sensitivity of the receiver in the designated one of the predetermined areas to set a signal receivable area for the receiver in accordance with the limit of the signal receiving sensitivity; and an operation unit connected to the control unit and operable by a person holding the portable device, the operation unit being operated to switch the receiver between the normal mode and the sensitivity adjustment mode, wherein the operation unit is operated during the sensitivity adjustment mode to designate one of the predetermined areas to which the transmission signal is transmitted.

2. The portable device according to claim 1, wherein the control unit adjusts the signal receiving sensitivity of the receiver when the person holding the portable device operates the operation unit.

3. The portable device according to claim 2, wherein the control unit lowers or raises the signal receiving sensitivity of the receiver by the predetermined level whenever the operation unit is operated.

4. The portable device according to claim 1, wherein the control unit sets the signal receiving sensitivity of the receiver at a maximum level when adjusting the signal receiving sensitivity of the receiver and then consecutively lowers the signal receiving sensitivity by the predetermined level, the control unit automatically setting the signal receiving sensitivity of the receiver at a level just before the receiver shifts from a state in which the transmission signal is received to a state in which the transmission signal cannot be received.

5. The portable device according to claim 1, wherein the control unit starts to adjust the signal receiving sensitivity only when the transmission signal is receivable by the receiver.

6. The portable device according to claim 1, wherein the control unit sets the signal receiving sensitivity of the receiver at a minimum level when adjusting the signal receiving sensitivity of the receiver and then consecutively raises the signal receiving sensitivity by the predetermined level, the control unit automatically setting the signal receiving sensitivity of the portable device at a level at which the receiver shifts from a state in which the transmission signal cannot be received to a state in which the transmission signal is received.

7. The portable device according to claim 2, wherein the predetermined control subject is a vehicle having a door, the operation unit includes a first switch for locking the door of the vehicle and a second switch for unlocking the door of the vehicle, and the control unit enters the sensitivity adjustment mode when the first switch and the second switch are operated in accordance with a predetermined procedure.

8. The portable device according to claim 7, wherein the control unit sets the signal receiving sensitivity of the receiver at a maximum level when entering the sensitivity adjustment mode and then lowers the signal receiving sensitivity by the predetermined level whenever any one of the first switch and the second switch is operated, the signal receiving sensitivity of the receiver being set at a level just before the receiver shifts from a state in which the transmission signal is received to a state in which the transmission signal cannot be received.

9. The portable device according to claim 8, further comprising:
an indicator connected to the control unit, the control unit illuminating the indicator when the receiver receives the transmission signal in the sensitivity adjustment mode.

10. The portable device according to claim 7, wherein the control unit sets the signal receiving sensitivity of the receiver at a minimum level when entering the sensitivity adjustment mode and then raises the signal receiving sensitivity by the predetermined level whenever any one of the first switch and the second switch is operated, the signal receiving sensitivity of the receiver being set at a level at which the receiver shifts from a state in which the transmission signal cannot be received to a state in which the receiver receives the transmission signal.

11. The portable device according to claim 10, further comprising:
an indicator connected to the control unit, the control unit illuminating the indicator when the receiver receives the transmission signal in the sensitivity adjustment mode.

12. The portable device according to claim 1, wherein the receiver includes a receiver circuit for receiving the transmission signal, the receiver circuit includes an antenna having directivity, and the control unit adjusts the signal receiving sensitivity of the receiver circuit.

13. A remote control system comprising:
a controller for controlling a predetermined controlled subject;
a portable device for performing wireless communication with the controller and remotely controlling the controller, the portable device including:
a receiving means for receiving a transmission signal from the controller in a plurality of predetermined areas and being selectively operable in a normal mode and a sensitivity adjustment mode, the receiving means having an adjustable signal receiving sensitivity enabling receipt of the transmission signal;
a sensitivity adjustment means, connected to the receiving means, for lowering or raising the signal receiving sensitivity of the receiving means by a predetermined level in the sensitivity adjustment mode in cooperation with the transmission signal when the portable device is located in a designated one of the predetermined areas to which the transmission signal is transmitted,
wherein when in the sensitivity adjustment mode, the sensitivity adjustment means finds a limit for the signal receiving sensitivity of the receiving means in the designated one of the predetermined areas to set a signal receivable area for the receiving means in accordance with the limit of the signal receiving sensitivity; and
an operation unit connected to the sensitivity adjustment means and operable by a person holding the portable device, the operation unit being operated to switch the receiving means between the normal mode and the sensitivity adjustment modes,
wherein the operation unit is operated during the sensitivity adjustment mode to designate one of the predetermined areas to which the transmission signal is transmitted.

14. The remote control system according to claim 13, wherein the sensitivity adjustment means adjusts the signal receiving sensitivity of the receiving means when the person holding the portable device operates the operation unit.

15. The remote control system according to claim 14, wherein the sensitivity adjustment means of the portable device lowers or raises the signal receiving sensitivity of the receiving means by the predetermined level whenever the operation unit is operated.

16. The remote control system according to claim 13, wherein the sensitivity adjustment means sets the signal receiving sensitivity of the receiving means at a maximum level when adjusting the signal receiving sensitivity of the receiving means and then consecutively lowers the signal receiving sensitivity by the predetermined level, and the sensitivity adjustment means automatically sets the signal receiving sensitivity of the receiving means at a level just before the receiving means shifts from a state in which the transmission signal is received to a state in which the transmission signal cannot be received.

17. The remote control system according to claim 13, wherein the sensitivity adjustment means sets the signal receiving sensitivity of the receiving means at a minimum level when adjusting the signal receiving sensitivity of the receiving means and then consecutively raises the signal receiving sensitivity by the predetermined level, the sensitivity adjustment means automatically setting the signal receiving sensitivity of the receiving means at a level at which the receiving means shifts from a state in which the transmission signal cannot be received to a state in which the transmission signal is received.

18. The remote control system according to claim 13, wherein the controller controls at least enabling engine starting or locking and unlocking of a door in a vehicle.

19. The remote control system according to claim 13, wherein the portable device includes a transmitter for transmitting a mode change signal to the controller to operate the controller in the sensitivity adjustment mode.

* * * * *

UNITED STATES PATENT AND TRADEMARK OFFICE
CERTIFICATE OF CORRECTION

PATENT NO.        : 7,443,287 B2                                    Page 1 of 1
APPLICATION NO.   : 11/227579
DATED             : October 28, 2008
INVENTOR(S)       : Masayuki Kawamura et al.

It is certified that error appears in the above-identified patent and that said Letters Patent is hereby corrected as shown below:

Column 5
Line 29: delete "operation'signal" and insert therefor -- operation signal --.

Column 14
Line 41: after "sensitivity adjustment" delete "modes," and insert therefor -- mode, --.

Signed and Sealed this

Seventh Day of April, 2009

JOHN DOLL
*Acting Director of the United States Patent and Trademark Office*